United States Patent [19]

Quarles

[11] 4,298,299
[45] Nov. 3, 1981

[54] HAIRPIN COTTER KEY

[76] Inventor: James R. Quarles, 801 Hill St., Springfield, Tenn. 37172

[21] Appl. No.: 970,133

[22] Filed: Dec. 18, 1978

[51] Int. Cl.³ .............................................. F16B 21/14
[52] U.S. Cl. ................................ 411/514; 24/201 LP; 411/513;514;515
[58] Field of Search ................. 85/8.1, 8.3; 24/201 LP

[56] References Cited

U.S. PATENT DOCUMENTS

| 71,457 | 11/1867 | Cooper. | |
|---|---|---|---|
| 78,651 | 6/1868 | Couch. | |
| 179,169 | 6/1876 | Eastman. | |
| 188,417 | 3/1877 | Sanderson et al.. | |
| 282,183 | 7/1883 | Fletcher. | |
| 831,197 | 9/1906 | Teure. | |
| 893,841 | 7/1908 | Grogan. | |
| 958,532 | 5/1910 | Pollock. | |
| 1,062,774 | 5/1913 | Else. | |
| 1,190,908 | 7/1916 | Kafader | 85/8.3 X |
| 1,255,118 | 1/1918 | McRoberts. | |
| 1,799,934 | 4/1931 | Strid | 85/8.3 |
| 2,046,781 | 7/1936 | Head. | |
| 2,127,257 | 8/1938 | Hornberger. | |
| 2,240,693 | 5/1941 | Elnes. | |
| 2,399,119 | 4/1946 | Howell | 85/8.3 |
| 3,175,453 | 3/1965 | Williams | 85/8.3 |
| 3,333,307 | 8/1967 | Wheeler. | |
| 3,675,275 | 7/1972 | Arblaster | 24/81 HS |
| 3,996,937 | 12/1976 | Williams | 128/325 |
| 4,205,586 | 6/1980 | MacNeill | 85/8.3 |

FOREIGN PATENT DOCUMENTS

| 76066 | 12/1917 | Austria | 24/201 LP |
|---|---|---|---|
| 678356 | 12/1964 | Italy | 85/8.1 |
| 123461 | 2/1919 | United Kingdom | 85/8.3 |
| 964317 | 6/1964 | United Kingdom | 85/8.1 |
| 24501 | 10/1969 | U.S.S.R. | 85/8.3 |

OTHER PUBLICATIONS

Catalog Western Wire Products Co., Jan. 1977, St. Louis, Mo., pp. 1–20.
Catalog Precision Stanho Products, Standard Horse Nail Corp., New Brighton, PA, 4 pages.
Catalog C.E.M. Designing with Spirol Pin Fasteners, Danielson, Conn., pp. 1–24 (Catalog No. T-1277).
Catalog 103, Bee Industries Inc., The New Home of Machine Pins, Bridge Pins, Spring, Lock Pins, Mar. 1977, pp. 1–15, Watertown, Wisc.
Catalog #47, Medalist Leitzke, Jan. 1, 1978, pp. 1–61, Hutisford, Wisc.

Primary Examiner—Thomas J. Holko
Attorney, Agent, or Firm—John B. Hardaway, III; Wellington M. Manning, Jr.; Luke J. Wilburn, Jr.

[57] ABSTRACT

A hairpin style cotter key of wire-like stock having a pair of cooperable legs, utilizing the resilient means provided by said stock to create safe, reliable, and quick clamping means to various structural components to be held in place by the combination and interaction of the piercing means of the shorter straight leg and the receiving means of the longer intersecting leg in conjunction with the aforesaid leg of the present device.

7 Claims, 8 Drawing Figures

U.S. Patent    Nov. 3, 1981    Sheet 1 of 2    4,298,299
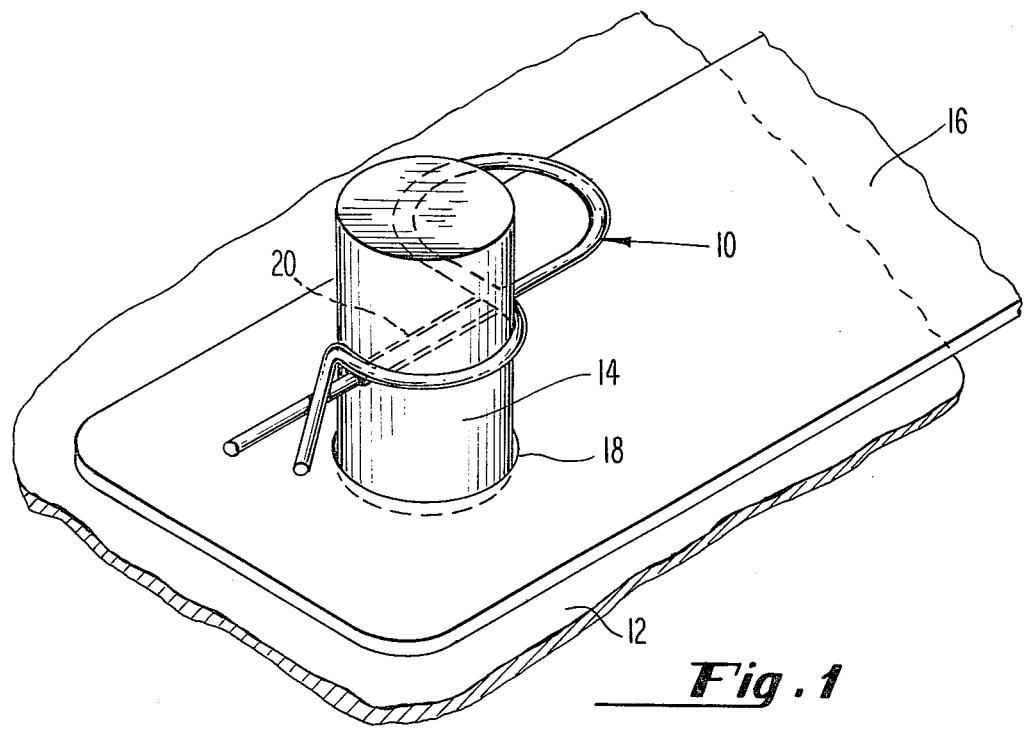
Fig. 1
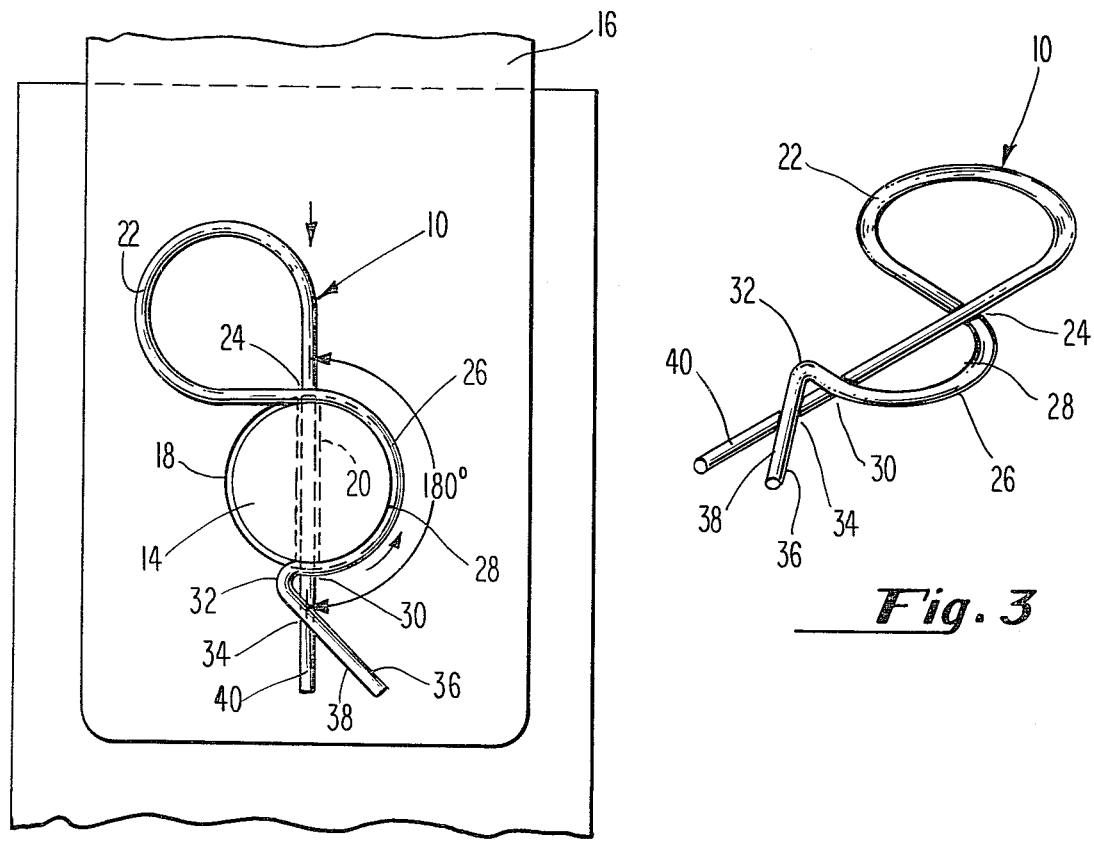
Fig. 2
Fig. 3

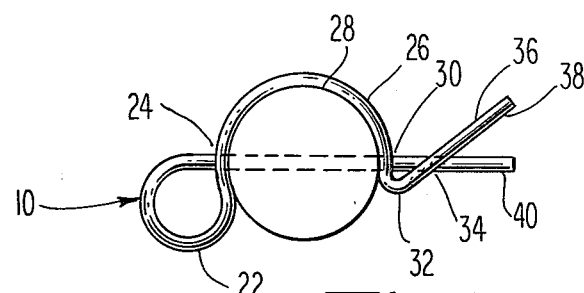
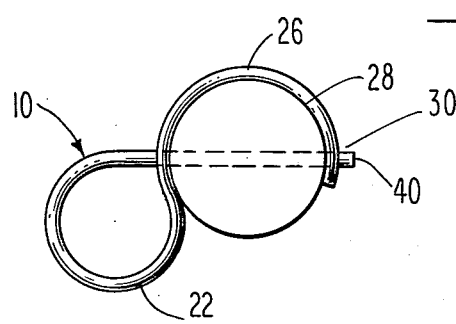
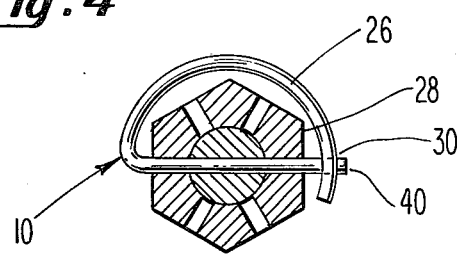
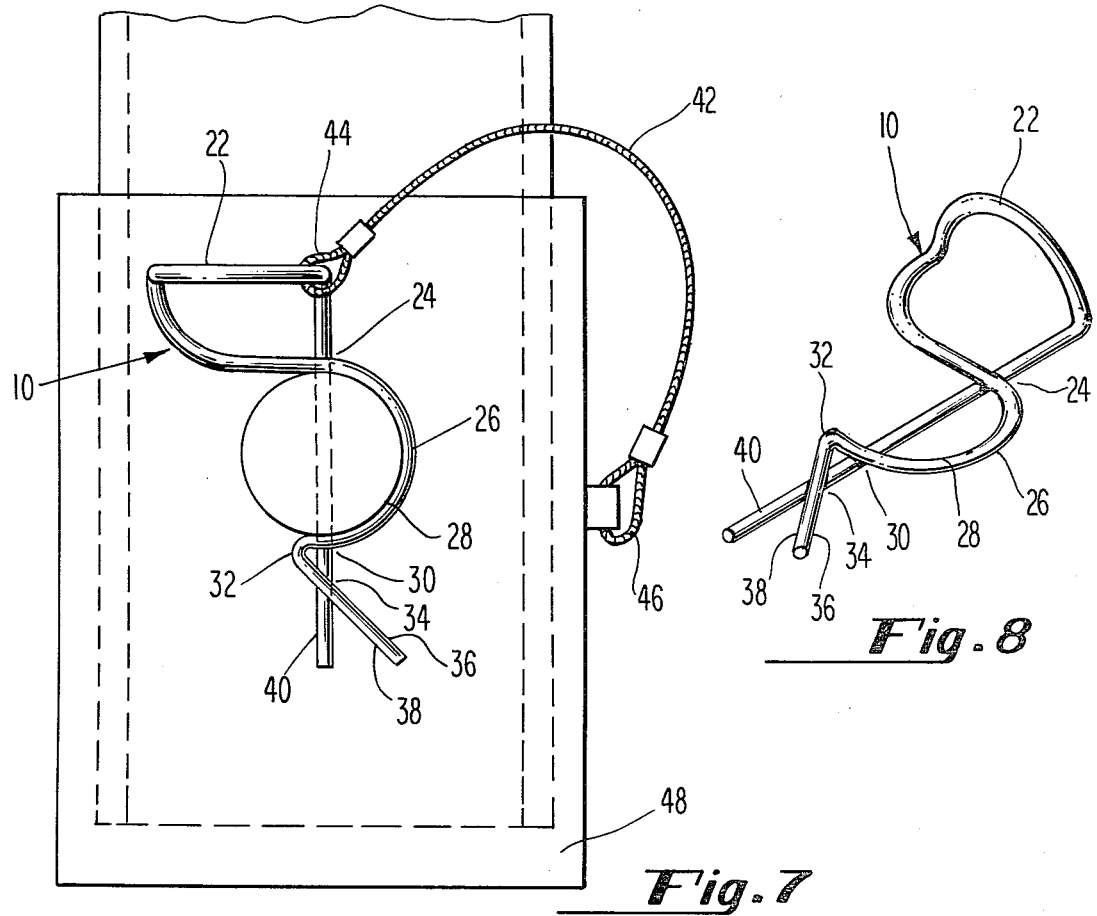
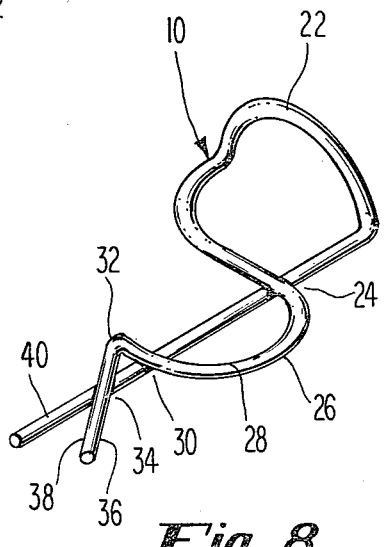

HAIRPIN COTTER KEY

BACKGROUND OF THE INVENTION

1. Field of the Invention

This invention relates to locking pins generally and more particularly to hairpin style cotter keys.

2. State of the Prior Art

Various forms of cotter keys, headed pin fastners, hairpin fastners, clinch pins, hitch pins, humped cotters, and similar clips are utilized today in applications where standard roll pin fastners would not be satisfactory. Such fastners are preferred in the agricultural, aircraft and automotive industries because a positive lock feature is mandatory for personal and equipment protection reasons. The rapidly expanding phenomena of products liability claims has necessitated the utilization of new forms of fastners such as those identified above to prevent inadvertent or accidental loss. Exemplary of some of the prior art devices are U.S. Pat. Nos. 2,399,119, Howell, 1946, and 3,175,453, Williams, 1965. Other examples can be found in the product catalogs of the following industries: CEM Company, Inc., Danielson, Connecticut; Bee Industries, Inc., Watertown, Wisconsin; Standard Horse Nail, New Brighton, Pennsylvania; Leitzke Division, Medalist Industries, Hustisford, Wisconsin; Western Wire Products Company, St. Louis, Missouri.

Many of these devices, however, have proven to be unsatisfactory or unsuitable for their intended purpose because of loss created by vibrations in their applications. Further disadvantages arise from inconvenience due to size, weight or complexity of the device. The necessity of special tools or procedures for their installation, or the acquisition of individuals having special skills and mechanical aptitudes to apply them have all been objectionable characteristics of the prior art devices. Additional disadvantages have been the unwarranted expenditures of time and effort by workmen to install such devices while exposing themselves to unjustifiable risk of harm.

SUMMARY OF THE INVENTION

Accordingly, the deficiencies of the prior art devices are obviated by the present invention which provides a firm, reliable locking action in a minimum of space, readily adaptable to internal or external applications, and is thereby more practical, efficient and durable while being susceptible to a greater number of applications and accomplishing more numerous intended purposes.

Therefore, the present invention contemplates, as its object, an automatic self-locking pin simple in design and use which is effective in the intended application and which has an extended service life capable of repeated installations and removals. Another object of the present invention is to provide a versatile, unique device of novel form which is capable of meeting all mandatory safety requirements for workmen and the public at large and which can also achieve various industry, government, and trade association specifications, standards or certification requirements.

Unlike other prior art devices, the present invention can be made from stronger metal alloys since it need not be maleable. It relies more on its form than spring tension or memory-like properties of its material of construction to remain in place. And, because it is under zero stresses after being installed, it does not undergo a significant loss of properties in application or sustain work hardening by being bent or distorted as commonly occurs with ordinary cotter keys and locking pins.

It is another object of the invention to provide a substitute device which is simple in construction, easily fabricated, inexpensive to manufacture, and readily mass produced in quantities. It is reasonably believed that the present invention is an economically feasible improvement of existing technology which satisfies these objectives. When applied, the present invention affords fast, uncomplicated field assembly of members, components or structures. It is easily installed without special tools or mechanical abilities since it is self-fitting, self-retaining, and positive-locking in nature. Undue risk of harm to the public, equipment operators, installers, equipment and personal property is obviated by the safe, fast, dependable fastening action of the present invention which cannot be removed without separate and distinct forces being applied in two different directions to remove an installed device of the present invention. This design obviates vibration losses or other forms of accidental loss and assures availability for repeated installations.

A further object of the present invention is to provide an improved device which has a bearing surface which extends over 180° or 50% of the circumference of the member, component, or structure being held in position by the present device. Because the bearing surface tangently extends around the member beyond the centerline of said member, the present invention achieves significant deviations from standard hairpin cotters which usually have bearing surfaces of less than 33% of the circumference. This novel design feature means that the majority of pressure points in the present invention are approximately 90° to the long axis of the shaft of the pin.

In use, the present invention is quickly installed by placing direct pressure on the device and the member, component, or structure to which the device is to be attached. This pressure causes the legs of the R-shaped portion of the present invention to be forced open in a scissors-like motion until the member, component, or structure snaps into the looped portion of the R-shaped member at which time the legs spring back into their former position. Essentially no stresses are operable in this position and elastic forces to hold in position, as in standard hairpin cotters, are replaced by the form of the present invention which resists removal by vibration or other accidental loss. The present invention can only be removed by a direct pull on the pin and by an outward pull in a different direction of the intersecting leg of the R-shaped portion of the present invention. Thus, insertion and withdrawal achieve significant savings of time, manpower, and effort. No specially designed tools or standard tools are needed to position, install, or remove the present invention.

It is a further object of the present invention to provide a device of the characteristics mentioned to fulfill this longfelt need, achieve commercial success, and perform the referenced unexpected results currently unattainable by current locking pins or other cotters.

BRIEF DESCRIPTION OF THE DRAWINGS

These and other aspects of the invention will be more fully understood and appreciated from the following detailed description and explanation of the accompanying drawings in which:

FIG. 1 is a perspective view of a structural assembly showing the preferred embodiment of the hairpin cotter in position;

FIG. 2 is an elevational view of the structural assembly shown in FIG. 1;

FIG. 3 is a perspective view showing in detail a canted variation of the hairpin cotter;

FIG. 4 is a detail view of a variation of the present invention with the spring loop having a diameter size smaller than that of the member, component, or structure;

FIG. 5 is a detail view of a variation of the hairpin cotter with short legs for space limited applications;

FIG. 6 is a detail view of an ultra-compact variation of the hairpin cotter where minaturization is essential;

FIG. 7 is a detail view of another variation of the hairpin cotter using an anchoring device in a different type of structural assembly having relatively flat surfaces;

FIG. 8 is an enlarged detail view of the variation shown in FIG. 7.

DETAILED DESCRIPTION

Through the description that follows, like numerals refer to similar parts within the various drawings.

Referring to the drawings and particularly to FIG. 1 the hairpin cotter 10 of the present design is shown in a typical application such as a connecting means for a trailer tongue 12 with a post 14 welded thereon to be inserted through a riding lawnmower hitch attachment 16 with a surface opening 18 therein. As shown in FIG. 1, the post 14 is normal to the relative flat surfaces of the trailer tongue 12 and hitch attachment 16. Once inserted, the tongue 12 is held in its position relative to the hitch attachment 16 by installing the pin 10 through the opening 20 in the post 14. These latter components are shown and described for the purposes of indicating the principal utility of the present invention, and the precise form of the structural assembly to which it is applied does not form an essential element or part of the invention. The structure and form of the hairpin cotter 10 provides a novel means for quick, simple, and ready application or withdrawal of it as a retaining key or connecting means in almost any structural assembly. Additionally, the relative positioning of the respective legs of the present apparatus 10, their resiliency or properties of elastic memory, and their cooperable aspects assure a safe, reliable, holding means for said invention about the structural member to which it is attached.

In an application, such as that of FIG. 1, the quality and quanity of the vibrations, shocks, and related stresses created by the lawnmower has caused prior art fastners to weaken, work themselves loose, or sustain other forms of accidental loss because their design cannot sustain the vibrations, shocks, and stress loadings of such an application. These failures are obviated by the present invention which relies primarily upon the relative structure of its component parts to hold it in place rather than its maleability or the strength of its springlike properties as in prior art cotter keys. The preferred embodiment of the instant device is denoted in the drawings by the reference numeral 10 generally although various versions are also so designated.

The hairpin cotter 10 may be fabricated from any suitable material of construction such as a heat treated, polished, alloy steel which can be plated as desired to prevent corrosion or provide aesthetic appearance. The final fabricated pin can be plain, plated or coated so long as it exhibits some spring-like properties or resilient memory characteristics. It can be case hardened or tempered as necessary to meet industry requirements, government or industry specifications, and related certifications. Agencies which frequently set such standards are the Federal Aviation Administration, the Occupational Safety and Health Administration, the Mining Safety Enforcement Administration, the Consumer Product Safety Commission, the American Standards Association, the Department of Defense, the Association for Testing Materials, and the Society of Automotive Engineers.

The present invention can be bent into shape substantially as shown in FIG. 1 by either a machine or other forming process known in the metal working arts. It is formed of a single elongated strip or strand of wire-like stock, having a variety of cross-sectional configurations, so long as said stock exhibits spring-like, resilient characteristics with the relative gage-size of the stock being dependent upon the intended application. As a practical matter, the stock will normally be of a circular cross-section and will be manufactured in a variety of sizes to accomodate different diameter sizes of the structural member to which it is attached.

Referring to FIG. 2, to make the preferred embodiment of the present invention 10, one must select the appropriate gage of wire-like stock for the intended application, bearing in mind the diameter of the structural member, the consideration of corrosive applications or aesthetic appearances, and the necessary platings, coatings, or heat-treatments. That selected stock is then bent into a U-shape with one of the respective sides 36 of the U being longer in relation to the other side 40, but both extremities remain of appreciable length. From said form, the longer side 36 of the U is continued to be bent in the same plane, forming a first arcuate loop 22 which intersects the shorter side 40 of the U at a first perpendicular crossover point 24 and then continues from said point 24 to form a second loop 26 of semi-circular form closing said second loop at a second perpendicular crossover point 30 with respect to the shorter side 40. The longer side 36 of the U is then extended beyond the shorter side 40 at a 90° angle by at least a distance of one diameter of the cross-section of the side 40 at which point 32 the longer side 36 is then bent into an angular position with respect to the shorter side 40 intersecting said side a third time at a third cross-over point 34 at an appropriate angle, usually 45°, and extending therepast so that, as finally formed, the ends of the sides 36 and 40 are spatially disposed each from the other to form a crotch or receiving means for the structural member to which the present invention 10 is to be applied.

As thus formed, the present apparatus has an inserting means, a resilient actuating means, a clamping means, and an opening or receiving means. Various elements of the structure of the present invention 10 interact, cooperate, or relate one to another to form these various means in the preferred embodiment or in the modified versions. Because of its simplicity in structure, it can be easily fabricated and readily mass produced in sufficient quantities to assure a low and reasonable production cost.

FIG. 2 shows the detail of the relative components of the hairpin cotter 10 as viewed from the top of the structural assembly in FIG. 1. As its principal elements, the present invention has a first arcuate loop 22, a first perpendicular cross-over 24, a second arcuate loop 26, a first bearing surface 28 extending along the tangential portions of the second arcuate loop 26, a second perpendicular cross-over 30, an angular bend 32, a third angular cross-over 34, an intersecting leg 36, and a straight leg 40. A combination of the second loop 26, the angular bend 32, and a portion of the intersecting leg 36, together with the respective cross-over points 24, 30, and 34, comprise what is sometimes referred to herein as the R-shaped member because of its relative appearance. It is also noted that bearing surfaces exist between the respective cross-over points 24, 30 and 34, and the straight leg 40 upon which they move while the pin 10 is being installed or withdrawn.

In use, the hairpin cotter 10 requires no special procedures for installation and is applied after the trailer tongue 12 is lifted in place so that the post 14, welded perpendicular to its surface is engaged through the opening 18 of the hitching attachment 16. The present invention 10 is self-fitting and is positioned by inserting the straight leg 40 into the opening 20 in the post 14 until contact is made with the front of the intersecting leg 36 along its bearing surface 38 against the circumference of the post 14. As additional force is placed along the direction of the straight arrow shown in FIG. 2 the hairpin cotter 10 slides into position as the straight leg 40 travels through the opening 20 of the post 14 and the intersecting leg 36 automatically opens by the interaction of the resilient characteristics of the pin 10, the sliding bearing surface 38 along the front of the intersecting leg 36, and the rotation of the intersecting leg 36 in the direction of rotational movement shown by the curved arrow of FIG. 2. The respective legs 36 and 40 are cooperable, one with the other, as a final scissors-like action is completed in the opening process when the angular bend 32 clears the outer most tangent of the post 14 and the intersecting leg 36 snaps back into the position of zero stress, in relation to the insertable straight leg 40 according to its elastic memory. This property makes the instant device self-locking. As the pin 10 is inserted, the structural resistance provided by the first perpendicular cross-over 24 of the intersecting leg 36, with respect to the straight leg 40, prevents the pin from being beyond the correct position. No special tools, mechanical aptitudes, or skilled abilities are necessary to install the present invention, an obvious advancement over the prior art.

During the insertion process, the first loop 22 acts as a resilient spring decreasing in size as the scissors-like action takes place. In final position, the second loop 26 forms a grasping, bearing surface 28 against the majority, more than 180°, of the circumference of the post 14. This unique, novel feature of the present invention 10 makes it an extremely versatile, reliable, and efficient apparatus in practice. As positioned, the resilient properties of the hairpin cotter 10 cause the predominant pressure points in the second loop 26 along its inside bearing surface 28 to be approximately 90° to the long axis of the inserted straight leg 40 which penetrates the diameter of the post 14 through the opening 20. This feature gives the present invention a positive, yet firm and reliable gripping action against the structural member to which it is attached along its circumference.

In all prior art devices, the diameter of the loop, throat or bight between the two different legs of the hairpin cotter must be of the same diameter or form as the shaft, post or other structural member to which it is to be attached. This is because the prior art devices rely primarily upon their spring tension or resilient properties to remain in position. This is not the case with the present invention wherein its second loop 26 may be either larger, smaller, or of a different geometry than the structural member to which it is attached. Once in position, the hairpin cotter 10 can remain in position through either its structural design, its spring-like properties, or a combination of both. However, it should be noted that the second loop 26 cannot be of too small a radius or the angular bend 32 cannot operate in a scissors-like action.

Since most prior art devices only contacted 33% or less of the circumference of the shaft, post, or other structural member to which it is attached, the limiting point for the present invention to be as effective as prior art devices is for the angular bend 32 to extend just beyond the 90° clockwise position on the shaft 14 starting from the 0° point at the opening 20. This would give the present invention contact over approximately 25% of the circumference of the shaft, post or other structural member. In all other applications, however, the present invention 10 is not only equivalent, but it is superior! As applied in FIG. 2, the bearing surface 28 of the hairpin cotter 10 extends just over 180°, or 50%, of the circumference of the post 14. This is an extremely novel feature of the present device and the use of elastic forces to remain in place is nonessential to its utilization. This means that the hairpin cotter can achieve a greater number of applications than the prior art devices and thereby it is capable of fulfilling all intended purposes. This pin sustains no significant loss of properties or damage in repeated use because it relies on its form more than its elastic properties or maleability to remain in position. The common cotter key must be maleable and is broken, work-hardened, and damaged by being bent, distorted, and forced into position in repeated applications.

FIG. 3 shows in perspective view a canted variation or the present invention 10. It differs from the preferred embodiment of the hairpin cotter in that the first loop 22 is formed by passing the intersecting leg 36 under the straight leg 40 only at the first perpendicular cross-over point 24. In all other respects, the canted variation is formed according to the description for fabricating the preferred embodiment of FIG. 2. This canted variation gives the present invention additional scissors-like action and utilizes more of the resilient memory forces of the instant device to remain in position. While additional forces may have to be exerted to install or remove the canted version of FIG. 3, it is believed to be an excellent fastner with extensive possibilities in various applications due to the possession of elastic forces in two different horizontal planes.

Other forms may be taken by the present invention 10 depending upon the intended application. These may be essential where space is at a premium or where an internal application is preferred to an external installation. FIG. 4 is a detail view from the top of a modified version of the hairpin cotter 10 having a first loop 22 of a smaller radius than the second loop 26. The angular bend 32, intersecting leg 36, and the straight leg 40 are formed according to the practices for fabricating the preferred embodiment described in FIG. 2. This particular version is perhaps the most useful form of the present invention. As discussed above, the second loop 26 should closely conform to the radius of the shaft, post, or other structural member to which it is to be attached so that in excess of 180°, or 50%, of the shaft circumference is gripped along the inside bearing surface 28 of the second loop 26. In other applications where space is a primary consideration, the present invention 10 can take the structural form shown in FIG. 5. This variation entails a straight leg 40 which is designed to extend just beyond the opening 20 in the post 14. The intersecting leg 36 is terminated just beyond the opening 20 in the post 14. The intersecting leg 36 is terminated just before the angular bend 32 so that the majority of the R-shaped member, excluding its loop, is omitted from the utilized structure. As in the standard variation of FIG. 2, the intersecting leg 36 must pass at least one diameter length of the straight leg 40 beyond the second perpendicular cross-over point at 30.

FIG. 6 shows an ultra-compact variation of the present invention 10 installed in a slotted nut such as used in automotive applications on wheel bearings and tie-rod ends. In this version, the first loop 22 is entirely omitted leaving some of the resilient characteristics of the preferred embodiment completely out. This means that the instant device 10 of FIG. 6 will be somewhat more difficult to install and remove necessitating the use of standard hand tools such as a pair of pliers. However, the present invention 10 can be made of stronger metal alloys than present prior art devices utilized in installations such as this because it need not be malleable as the prior art devices were required to be. This gives it greater adaptability from the traditional cotter key which is the most frequently used prior art device in this application causing severe problems in most applications with work-hardening failures, injuries to workmen such as barked knuckles or worse, and fatigue or related failure with resultant loss. All of these deficiencies are overcome by the present invention because of its unique design which permits extended service life and repeated installations or removals without loss. In this version, the R-shaped member is severed approximately one diameter length of the straight leg 40 past the second perpendicular cross-over point 30 leaving only the loop portion 26 of the said R-shaped member. The majority of the intersecting leg 36, all of the angular bend 32, and portions of the straight leg 40 are all omitted from this particular variation. All of the versions shown in FIGS. 4, 5 and 6 can take on the aspect of the canted variation shown in FIG. 3 without defeating any aspect of the advantages of the respective versions.

FIG. 7 is a perspective view of another variation of the hairpin cotter 10 showing the first loop 22 formed in a plane different from the majority of the rest of the pin. This loop 22 is formed at any suitable angle from the remainder of the body of the pin so that the loop does not lie parallel to the horizontal surface as does the majority of the pin. A variation formed in this manner 10 is more convenient to install and remove because it is easily grasped at the angled first loop 22. Any pinch points which may exist along the flat surfaced assembly to which it is attached is thus avoided, a relative advantage over the preferred embodiment in such assemblies. As discussed above, this variation could also take the canted aspects disclosed in FIG. 3. In use, the variation 10 of FIG. 7 has primary applications in the automotive and boating industries wherein extensive flat surfaces are encountered. In this applications, one end 42 of a safety cable 44 could be attached to the cotter pin 10 at the first loop 22. The opposite end 46 of the safety cable 44 could be attached to a receiving means 48 on a flat surface such as an automobile hood or a stanchion assembly on board a cargo ship as taught by Williams, U.S. Pat. No. 3,175,453 (1965). FIG. 8 details the variation shown in FIG. 7.

The present invention is a durable, versatile and reliable device which by its form alone obviates the problems of vibration or accidental loss sustained by prior art devices. A missing locking pin can result in serious personal injury or death to equipment operators, employees, or the public at large should an accident occur due to equipment breakdown, malfunction or vibrational disassembly. Such accidents expose equipment owners to claims under workmen's compensation laws, products' liability laws, various common law torts, many forms of administrative job safety and health actions, and even criminal prosecutions in some remote cases. Additionally, the equipment owner has sustained costly injury to his own equipment or property, and is probably legally responsible for other damages to the equipment, property, or vehicles of others. The number of applications in which the present invention can be utilized are limited only by the imagination. While it has been described herein as a hitch pin, it can also be used as a connecting pin, a clevis pin retainer, a yoke pin, etc. It has universal application in agricultural implements, construction or other types of heavy duty equipment, aircraft components, boat installations, automotive parts and fixtures, motorcycle frames, rotary tillers, lawnmowers, and other home tools and appliances.

The foregoing risk of harm and exposure to personal injury, legal liability, or responsibility, and property damage is entirely eliminated by the present invention because of its unique features described herein. Referring again to FIG. 3, the hairpin cotter 10 is vibration and related accidental-loss proof because it cannot be removed without forces being applied in two separate and distinct directions. The present device will not be removed by either a direct pull on the structural member to which it is attached or by a pull on the pin itself. To remove the present invention as shown in FIG. 3, a direct pull upon the pin 10 in the direction opposed to the straight arrow must be accompanied by a rotational movement of the intersecting leg 36 in the direction of the curved arrow to overcome the cooperable gripping means provided by the second loop 26 and the second perpendicular crossover point 30. These two separate and distinct forces release the pin 10 from the structural assembly, and the R-shaped portion of the intersecting leg snaps in a scissors-like action over the structural member to which it is attached and returns to the position of zero stress by virtue of its elastic memory. From the foregoing description, it can readily be seen that the instant device is capable of achieving significant savings of time, labor, and effort while accomplishing fast, safe, and dependable shop or field assembly of members, components, or other structural members. Neither experienced mechanics nor specially designed tools are needed to position, install, or remove the present invention.

From the foregoing description and reference to the accompanying drawings, it is believed that a clear, precise, and comprehensive understanding of the construction, operation, utilization, and the advantages of the present invention may be had by one normally skilled in the pertinent art of locking pins.

While the present invention has been illustrated and described herein with respect to certain specific embodiments, it will be appreciated by those skilled in the art that many adaptations, modifications, or departures can be made within the spirit and scope of the present invention. Accordingly, it is intended by the appended claims to cover all such adaptations, modifications, or departures as are within the equivalents of the herein illustrated and described hairpin cotter key.

What is claimed and desired to be secured by Letters Patent is:

1. A locking pin for safely, reliably, and quickly performing repeated assembly and disassembly in the shop and field, without special tools, mechanical abilities, and aptitudes, said device comprising:
   (a) a single piece of wirelike stock having appropriate gauge, platings, and coating for the intended application;
   (b) said wire having a bend therein to form two legs, one of said legs being of greater length than the other of said legs;
   (c) said one of said legs having a bend therein to form an arcuate loop of generally semicircular shape and thereafter extending tangentially from said arcuate loop across one side of said other leg at an angle of substantially 90° and extending beyond the crossover for a distance of more than one diameter of the wirelike stock to form an angular bend and again cross said one side of said other leg, and form a crotch to aid insertion of the locking pin.

2. The locking pin according to claim 1 wherein said arcuate loop is a second loop and a first arcuate loop is formed by a U-shaped bend between said legs and bend in said one leg whereby said one leg crosses said other leg at the termination of said first arcuate loop and prior to the bend forming said second arcuate loop.

3. The locking pin according to claim 1 wherein said crotch formed by the crossover of said legs is at an angle of substantially 45°.

4. A locking pin for safely, reliably, and quickly performing repeated assembly and disassembly operations in the shop or field, without special tools, mechanical abilities, or aptitudes, said device comprising:
   (a) a single piece of wire-like stock having appropriate gage, platings, and coatings for the intended application;
   (b) an initial bend into a U-shape, said bend occurring intermediate of the respective end portions of said stock, each extremity of the U remaining of appreciable length with one extremity being longer than the second;
   (c) a second bend in the longer extremity of the U to form a first arcuate loop of generally circular shape, and thereafter merging into an intersecting leg which first tangently crosses the shorter second extremity at a 90 degree angle resting upon its surface at a point on the shorter second extremity spatially disposed between its free end and its curved end merging into the U;
   (d) a third bend in the longer extremity of the U to form a second arcuate loop of generally semicircular shape and thereafter tangently crossing one side of the shorter second extremity a second time at a 90 degree angle resting upon its surface at a point on the shorter second extremity spatially disposed between its free end and its curved end merging into the U;
   (e) a fourth angular bend in the longer extremity of the U at a point more than one diameter of the wire-stock extending beyond the second tangential 90 degree crossover point on the shorter second extremity, thereafter intersecting the second shorter extremity on said one side at an angle of 45 degrees while resting tangentially upon its surface at a point spatially disposed intermediate of the free end and the curved end of the shorter second extremity and extending therefrom to its free end to form a cooperative receiving and clamping means within the body of the locking pin with the inserting means of the free end of the shorter second extremity.

5. A locking pin according to claim 4 wherein the said intersecting leg first tangently passes under the shorter second extremity at a ninety degree angle at their first intersection point.

6. A locking pin according to claim 4 wherein the said first arcuate loop is formed at any suitable angle with respect to the remainder of the pin so as to lie in a different plane and to facilitate the receipt of an anchoring means for attachment to the structural assembly in which it is applied.

7. A locking pin according to claim 4 wherein the said first and second arcuate loops are of differing diameters.

* * * * *